US006721262B1

(12) United States Patent
Jordache et al.

(10) Patent No.: US 6,721,262 B1
(45) Date of Patent: Apr. 13, 2004

(54) APERTURE STOP FOR A FLYING OPTICAL HEAD

(75) Inventors: Nicholas Jordache, Eden Prairie, MN (US); Ronald E. Gerber, Richfield, MN (US); Ghanim A. Al-Jumaily, Minneapolis, MN (US); Edward C. Gage, Apple Valley, MN (US); Lori G. Swanson, Minneapolis, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 935 days.

(21) Appl. No.: 09/051,680

(22) PCT Filed: Jan. 26, 1998

(86) PCT No.: PCT/US98/01424

§ 371 (c)(1),
(2), (4) Date: Sep. 4, 1998

(87) PCT Pub. No.: WO99/16063

PCT Pub. Date: Apr. 1, 1999

Related U.S. Application Data

(60) Provisional application No. 60/059,469, filed on Sep. 22, 1997.

(51) Int. Cl.[7] ............................................. G11B 17/00
(52) U.S. Cl. ....................................................... 369/244
(58) Field of Search ................................. 369/244, 212, 369/219, 112, 44.12

(56) References Cited

U.S. PATENT DOCUMENTS

| | | | |
|---|---|---|---|
| 5,198,916 A | | 3/1993 | Kim ............................. 359/15 |
| 5,361,244 A | | 11/1994 | Nakamura et al. ....... 369/44.23 |
| 5,541,906 A | * | 7/1996 | Kobayashi .................. 369/112 |
| 5,615,203 A | | 3/1997 | Fukakusa .................... 369/244 |
| 5,659,533 A | | 8/1997 | Chen et al. ................. 369/112 |
| 5,680,252 A | | 10/1997 | Sitter, Jr. et al. ........... 359/566 |
| 5,727,111 A | | 3/1998 | Kume et al. ................ 385/147 |

* cited by examiner

Primary Examiner—Allen Cao
(74) Attorney, Agent, or Firm—Theodore M. Magee; Westman, Champlin & Kelly, P.A.

(57) ABSTRACT

An optical head for performing optical data operations relative to a medium includes a slider body and at least one lens. Positioned between the slider body and the lens is an aperture stop for blocking the transmittance of light. The aperture stop includes an opaque layer that circumscribes a transparent region.

22 Claims, 4 Drawing Sheets

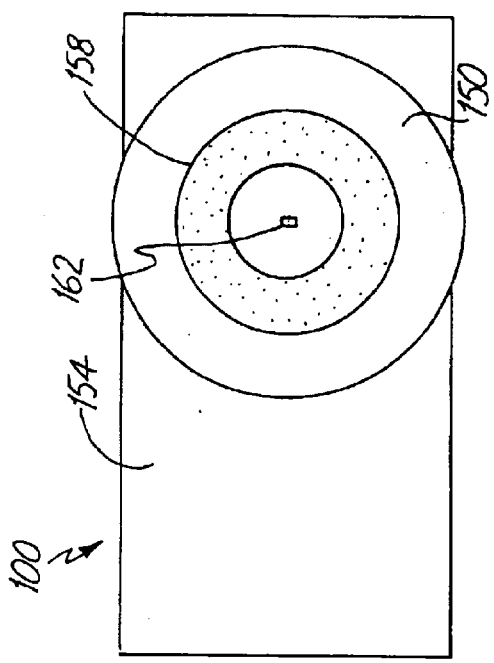
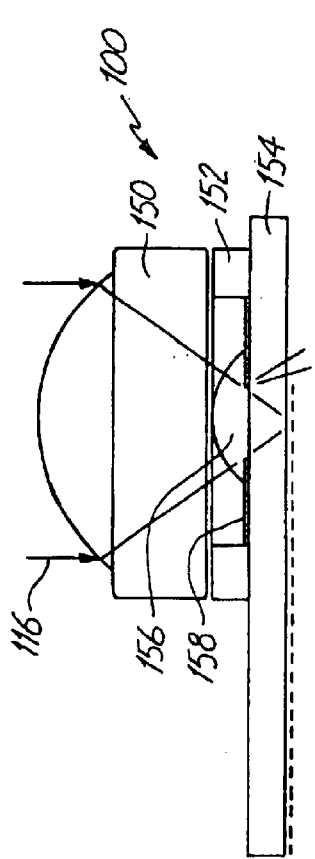
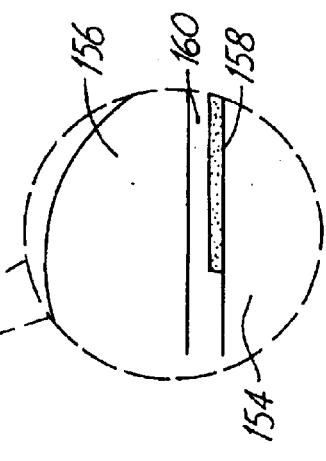

APERTURE STOP FOR A FLYING OPTICAL HEAD

REFERENCE TO CO-PENDING APPLICATION

This application claims priority benefits from U.S. provisional patent application No. 60/059,469 entitled "APERTURE STOP FOR A FLYING OPTICAL HEAD" filed on Sep. 22, 1997.

BACKGROUND OF THE INVENTION

The present invention relates to optical heads. In particular, the present invention relates to flying optical heads.

Optical data storage systems access data by focusing a laser beam or other light source onto a data surface of a medium and analyzing the light reflected from or transmitted through the medium. In general, data is stored in optical storage systems in the form of marks carried on the surface of the medium which are detected using a reflected laser light.

Compact discs, which are widely used to store computer programs, music and video, are one type of optical data storage system. Typically, compact discs are permanently recorded during manufacture by etching the surface of the compact disc. Another type of optical system is a write once read many (WORM) system in which a user may permanently write information onto a blank disc. Other types of systems are erasable, such as phase change and magneto-optic (M-O) systems. Phase change systems detect data by sensing a change in reflectivity. M-O systems read data by measuring the rotation of the incident light polarization due to the magnetic state of the storage medium.

The above systems require a beam of light to be focused on to a data surface of a disc. Storage density is determined not only by the size of the markings on the data surface, but also by the size of the beam focused on the surface (i.e., resolution). In general, the optics used to focus the beam on the surface can be divided into two groups: those with flying heads and those without flying heads. In those systems that do not use a flying head, a portion of the optics system typically moves radially over the disc to follow tracks on the disc. The moving portion of the optics is supported by a physical structure that extends over the disc. In systems with flying heads, the optics within the head are actually supported by a thin layer of fluid, typically air, that rotates with the disc. By flying on this thin layer of fluid, the optics of the head are positioned extremely close to the surface.

In both systems an objective lens is used to focus the light into a spot on the disc. In a system with a flying head, the objective lens is used in conjunction with a solid-immersion-lens or SIL. The objective lens focuses the beam into the SIL and the SIL reduces the beam spot size by virtue of wavelength reduction which occurs when light passes through optically dense media. Because it is on a flying head, the SIL is positioned very close to the data surface so that light from the SIL couples to the disc surface via evanescent waves.

In both optical systems, as light passes through the objective lens a portion of the light forms fringe fields around the perimeter of the otherwise focused beam. In systems where the objective lens and SIL do not fly over the medium, such as most compact discs, the objective lens is large enough that these fringe fields can be eliminated by coating the outer perimeter of the objective lens with a material that reflects or absorbs light. Alternatively, a separate piece may be inserted above the objective lens to block this extraneous light.

The coating method described above cannot be used with flying optical heads because the objective lens used in flying heads is too small and its hemispherical shape makes it difficult to properly align a mask for depositing material on the lens. Similarly, a separate piece cannot be added to the flying head to block the extraneous light because such a piece would add too much weight to the head.

SUMMARY OF THE INVENTION

An optical head for performing optical data operations relative to a medium includes a slider body and at least one lens. Positioned between the slider body and the lens is an aperture stop for blocking the transmittance of light. The aperture stop includes an opaque layer that circumscribes a transparent region.

In preferred embodiments, the aperture stop is deposited directly on the slider body through photolithography methods. The clear slider body allows the aperture stop to be aligned with a feature formed on the opposite side of the slider body.

BRIEF DESCRIPTION OF THE DRAWINGS

FIG. 3 is a side view of the optical head of FIG. 1.

FIG. 4 is an enlarged side view of a portion of the head of FIG. 3.

FIG. 5 is a top view of the head of FIG. 1.

DETAILED DESCRIPTION OF THE PREFERRED EMBODIMENTS

Figure 1:
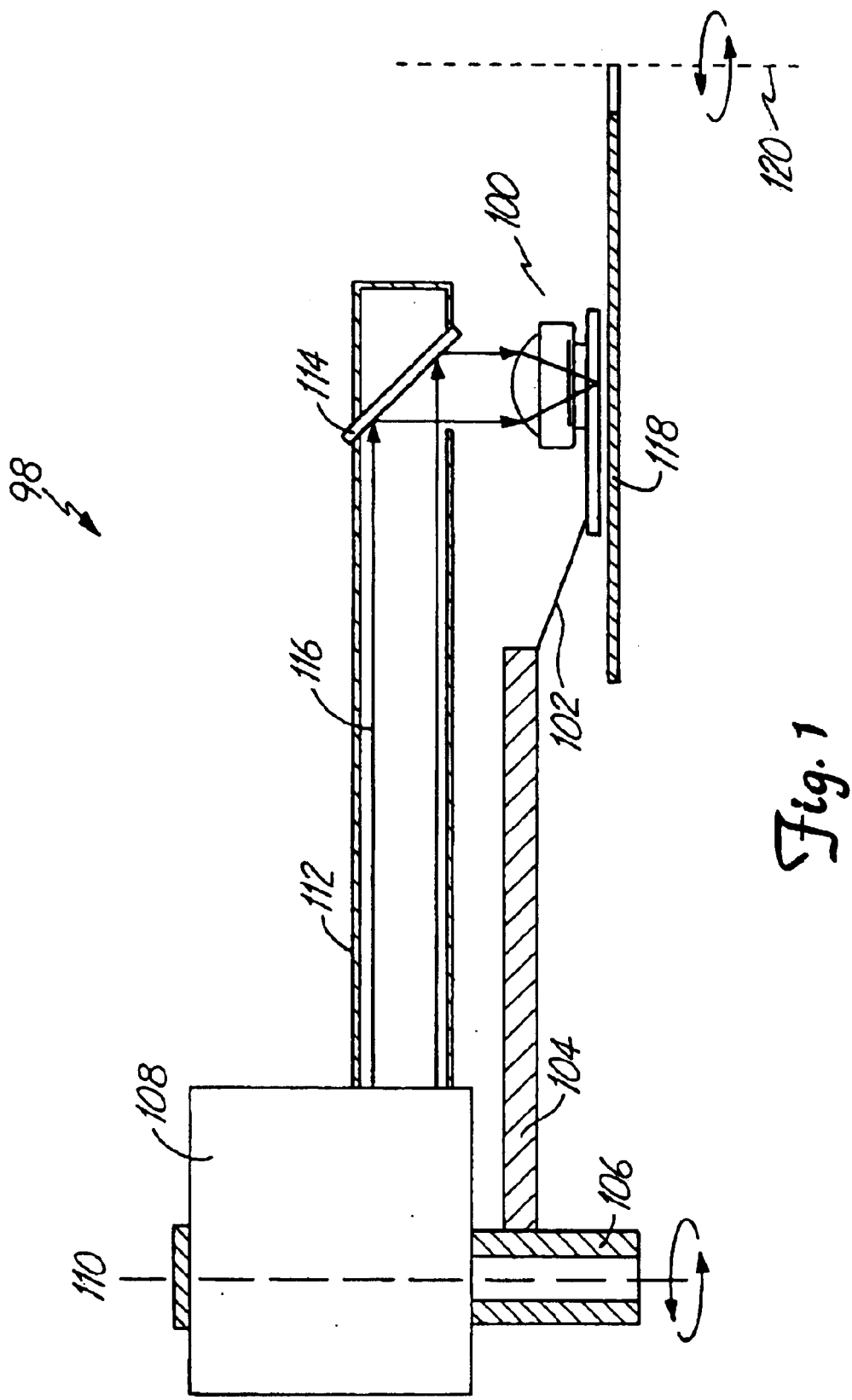
FIG. 1 is a side view of an optical system of the present invention.

FIG. 1 is a side view of an optical storage system 98 of the present invention. An optical module 108, which includes a laser, creates a light beam 116 that is directed through an enclosed optical path 112 extending laterally from optical module 108. Light beam 116 reflects off a bending mirror 114 toward an optical head 100, which focuses the beam into a small spot on a disc 118. Disc 118 spins about a central axis 120, continuously bringing new data regions underneath the spot of light produced by optical head 100. The light incident on disc 118 is reflected back through enclosed optical path 112 and is analyzed by a control module attached to optical module 108. Through this process, optical storage system 98 retrieves information stored on disc 118.

Optical head 100 is supported by a suspension assembly 102 that is supported by an arm 104. Arm 104, optical module 108, and enclosed optical path 112 are all supported by a spindle 106, which rotates about a central axis 110. As spindle 106 rotates, head 100 moves to different radial positions across disc 118 and enclosed optical path 112 rotates to remain aligned with optical head 100.

Figure 2:
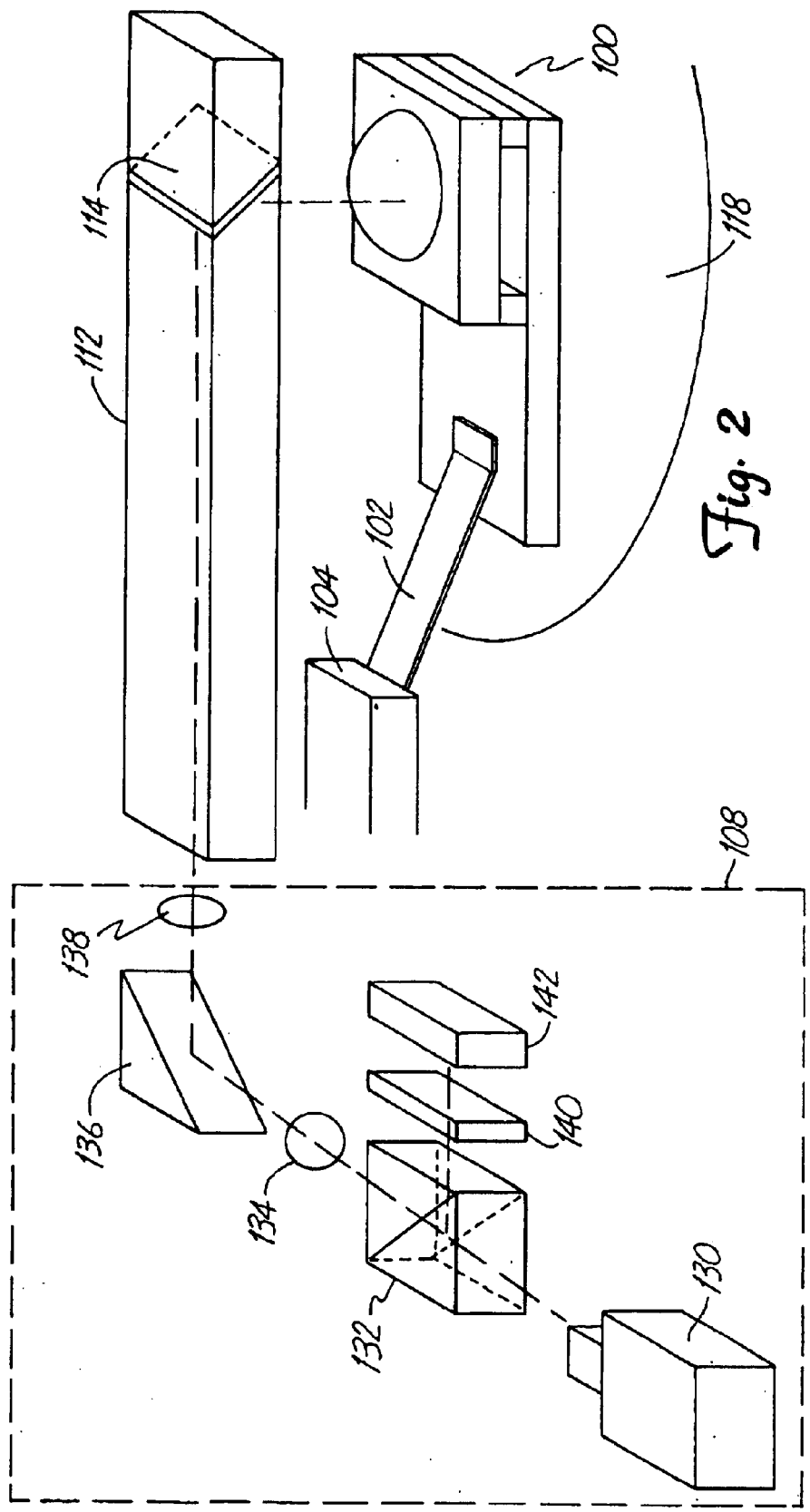
FIG. 2 is a schematic diagram of the optics in the optical system of FIG. 1.

FIG. 2 is a schematic diagram of the optics in optical system 98 of FIG. 1. Within optical module 108, a laser diode 130 generates a light that passes through a beam splitter 132 and a relay lens 134, reflects off a galvo mirror 136, is collimated by an imaging lens 138, reflects off bending mirror 114, and is focused onto optical disc 118 by optical head 100. The light reflects off optical disc 118, returns through head 100, reflects off bending mirror 114, passes through imaging lens 138, reflects off galvo mirror 136, passes through relay lens 134, is reflected by beam splitter 132, passes through a Wollaston prism 140, and comes to focus either before or after a detector plane 142. In preferred embodiments, galvo mirror 136 is capable of being deflected by an electric current in order to change the position of the light spot on the disc. This provides fine positioning control of the light spot making it possible to move the spot of light across several tracks on the disc without moving optical head 100.

FIG. 3 is a side view of optical head 100 of FIG. 1. Light 116 enters an objective lens 150 that is supported by a standoff 152 on a transparent slider body 154. Light 116 is focused by objective lens 150 through a cap lens 156 that is bonded to slider body 154 by an adhesive. Together, cap lens 156, the adhesive, and slider body 154 form a solid immersion lens. Beneath the perimeter of cap lens 156 is an opaque layer forming an aperture stop 158. The opaque layer of aperture stop 158 surrounds a transparent region that permits light 116 to pass into and through slider body 154. Objective lens 150, cap lens 156, and aperture stop 158 operate together to form a small light spot at the bottom surface of slider body 154. Aperture stop 158 prevents extraneous light at the perimeter of objective lens 150 from passing through slider body 154, thereby improving the resolution of the spot.

FIG. 4 is an enlarged view of a portion of aperture stop 158 and cap lens 156. As shown in FIG. 4, aperture stop 158 is preferably formed from a layer of material deposited directly on slider body 154. In addition, cap lens 156 is bonded to slider body 154 and aperture stop 150 by an adhesive layer 160. It should be noted that the thickness of adhesive layer 160 affects the absorption and reflectance of light that is incident on aperture stop 158. It is preferred that the absorption of light be maximized and that the reflectance of light be minimized for light that is incident on aperture stop 158. In preferred embodiments, where aperture stop 158 was formed from chromium, reflectance was minimized for an adhesive layer of 450 nanometers measured from the top of aperture stop 158 to the bottom of cap lens 156.

FIG. 5 is a top view of optical head 100 showing objective lens 150, aperture stop 158 and slider body 154. FIG. 5 also shows a topography feature 162 that extends from the bottom of and is formed as a single piece of material with slider body 154. Topography feature 162 is centered within aperture stop 158 and objective lens 150, and is preferably used as a reference point for positioning the masks to produce aperture stop 158 on slider body 154. The outer perimeter of aperture stop 158 may then be used to position standoff 152 relative to the center of aperture stop 158. In that position, standoff 152 provides an excellent starting location for positioning objective lens 150. The exact placement of objective lens 150 is achieved by passing a light beam through optical head 100 and moving the objective lens until the spot at the bottom of the slider is optimized. Aperture stop 158 quickens this process by significantly degrading the spot when the objective lens is off-center relative to the center of aperture stop 158.

Figure 6:
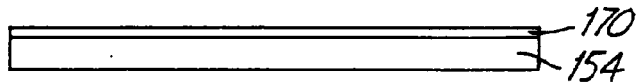
FIGS. 6(1) through 6(8) are side views of the head of FIG. 1 during different steps of manufacturing the head.
Figure 6:
Figure 6:
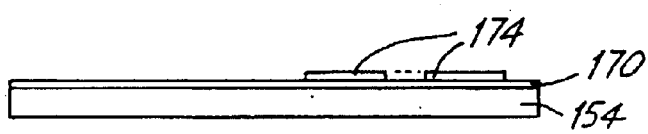
Figure 6:
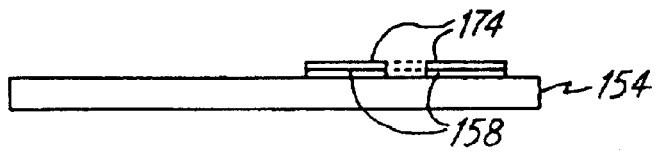
Figure 6:
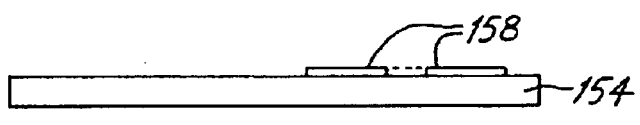
Figure 6:
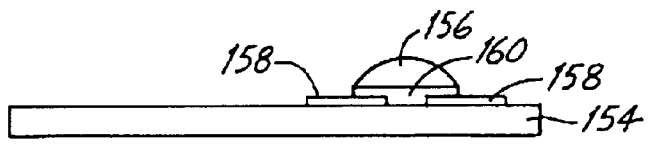
Figure 6:
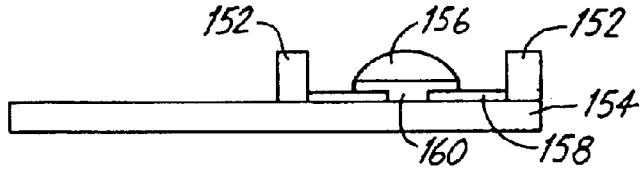
Figure 6:
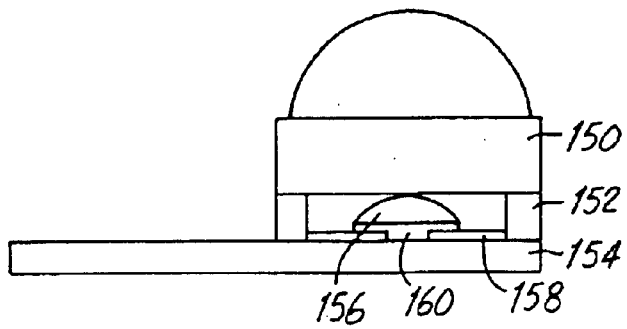

FIGS. 6(1) through 6(8) show different stages of optical head 100 during the process of manufacturing the head. In the first stage shown in FIG. 6(1), slider body 154 is coated with an opaque layer of material 170, which is preferably an optically reflective material such as chromium. Preferably, the layer of chromium is 1000 angstroms thick. In FIG. 6(2), the second step of the method involves coating opaque layer 170 with a photoresist 172. In FIG. 6(3), photoresist 172 has been patterned using a shadow mask and has been developed to remove unwanted photoresist material leaving patterned ring 174 on opaque layer 170. The portions of opaque layer 170 that are not protected by protective ring 174 are removed leaving aperture stop 158 covered by protective ring 174 as shown in FIG. 6(4). In FIG. 6(5) protective ring 174 has been removed leaving aperture stop 158 exposed.

FIG. 6(6), adhesive 160 is applied to aperture stop 158 and the portion of slider body 154 located within the center of aperture stop 158. Cap lens 156 is applied on top of adhesive 160 and is thus bonded to slider body 154 and aperture stop 158. In FIG. 6(7), standoff 152, which is in the form of a ring, is aligned with the outer perimeter of aperture stop 158 and is bonded to slider body 154. In the final step of the process, shown in FIG. 6(8), object lens 150 is mounted on standoff 152, and centered on the center of aperture stop 158 to optimize the light spot formed at the bottom of slider body 154.

Although the present invention has been described with reference to preferred embodiments, workers skilled in the art will recognize that changes may be made in form and detail without departing from the spirit and scope of the invention.

What is claimed is:

1. An optical head for performing optical data operations relative to a medium, the optical head comprising:

a slider, positionable over multiple locations on the medium; and light controlling means, coupled to the slider, for focusing and limiting light transmission relative to the medium.

2. The optical head of claim 1 wherein the light controlling means comprises:

a lens; and an aperture stop, the aperture stop between the lens and the slider.

3. The optical head of claim 2 wherein the lens is a cap lens.

4. The optical head of claim 3 wherein the aperture stop is an opaque layer circumscribing a transparent region.

5. The optical head of claim 4 wherein the cap lens is bonded to a portion of the opaque layer by an adhesive.

6. The optical head of claim 5 wherein the adhesive contacts the slider in the transparent region.

7. The optical head of claim 4 wherein the opaque layer comprises an optically reflective material.

8. The optical head of claim 7 wherein the opaque layer comprises chromium.

9. The optical head of claim 3 further comprising an objective lens, the cap lens between the objective lens and the aperture stop.

10. A method of constructing an optical head, the method comprising:

constructing a slider body;

forming an opaque layer on the slider body, the opaque layer having an aperture; and constructing a lens system so that the opaque layer is between the lens system and the slider body.

11. The method of claim 10 wherein the opaque layer is formed through photolithography and the opaque layer is aligned on the slider body relative to a feature found on the opposite side of the slider body from the opaque layer.

12. The method of claim 10 wherein the step of constructing a lens system comprises:

bonding a cap stand to the slider body, the cap stand aligned on the slider body using the outer perimeter of the opaque layer; and bonding an objective lens to the cap stand.

13. The method of claim 12 wherein the step of constructing a lens system further comprises bonding a cap lens to the opaque layer with an adhesive.

14. An optical head for conveying light representing data stored on a medium, the optical head comprising:

a slider body;

at least one lens; and an aperture stop positioned between the slider body and the at least one lens.

15. The optical head of claim 14 wherein the aperture stop comprises an opaque layer of material surrounding a transparent region.

16. The optical head of claim 15 wherein the opaque layer is planar.

17. The optical head of claim 15 wherein the at least one lens comprises an objective lens.

18. The optical head of claim 17 wherein the at least one lens further comprises a cap lens, the cap lens between the objective lens and the aperture stop.

19. The optical head of claim 18 wherein the aperture stop further comprises an adhesive and wherein the cap lens is bonded to the opaque layer by the adhesive.

20. The optical head of claim 19 wherein the thickness of the adhesive between the cap lens and the opaque layer minimizes reflectance away from the opaque layer.

21. The optical head of claim 19 wherein the adhesive contacts the slider in the transparent region.

22. A disc drive for performing optical data operations relative to a medium, the disc drive comprising:

a light source, capable of producing light;

an optics system coupled to the light source and capable of directing light produced by the light source;

an optical head, receptive of light from the optics system, the optical head comprising a slider proximate the medium, an aperture stop, and a lens, the aperture stop between the slider and the lens.

* * * * *